W. L. WALTON & J. WAGAR.
MOTOR PLOW.
APPLICATION FILED AUG. 3, 1909.

1,106,529.

Patented Aug. 11, 1914.
2 SHEETS—SHEET 1.

WITNESSES

INVENTORS
WILLIAM L. WALTON
JEROME WAGAR
BY Paul & Paul
ATTORNEYS

W. L. WALTON & J. WAGAR.
MOTOR PLOW.
APPLICATION FILED AUG. 3, 1909.
1,106,529.
Patented Aug. 11, 1914.
2 SHEETS—SHEET 2.
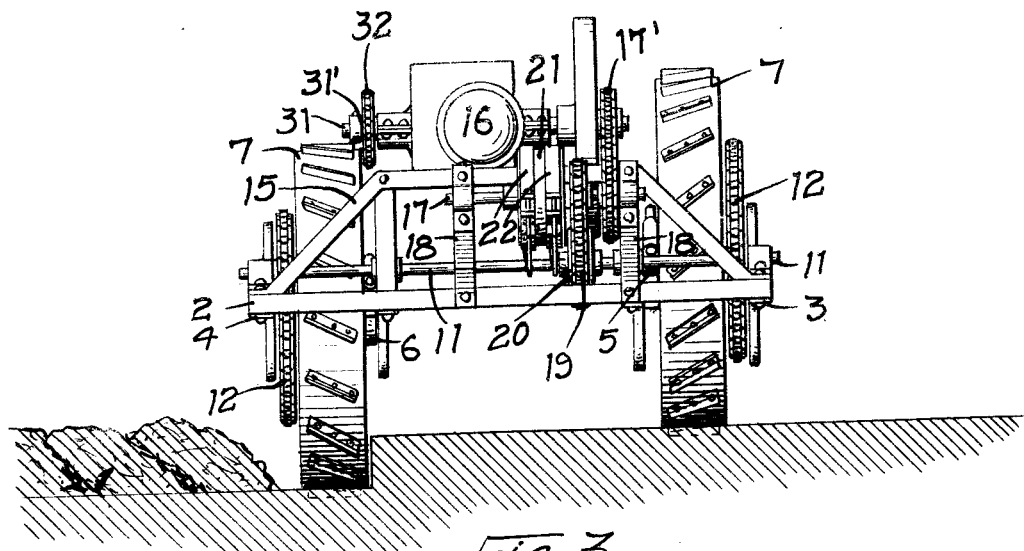
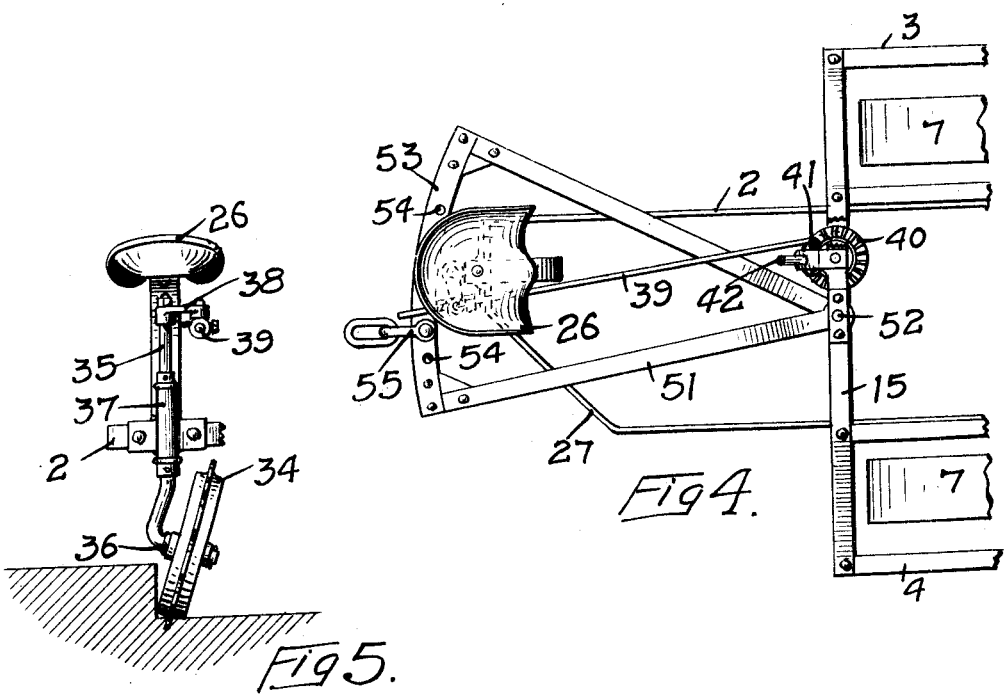
WITNESSES
INVENTORS
WILLIAM L. WALTON
JEROME WAGAR
BY Paul & Paul
ATTORNEYS

UNITED STATES PATENT OFFICE.

WILLIAM L. WALTON AND JEROME WAGAR, OF BANTRY, NORTH DAKOTA.

MOTOR-PLOW.

1,106,529.  Specification of Letters Patent.  Patented Aug. 11, 1914.

Application filed August 3, 1909. Serial No. 511,055.

*To all whom it may concern:*

Be it known that we, WILLIAM L. WALTON and JEROME WAGAR, of Bantry, McHenry county, North Dakota, have invented certain new and useful Improvements in Motor-Plows, of which the following is a specification.

The primary object of our invention is to provide a machine wherein the source of motive power is mounted directly on the frame, which carries the plows, thus making the apparatus compact and easily handled.

A further object is to provide a machine designed particularly for plowing, but capable of attachment to other agricultural implements, as a means for traction.

Our invention consists generally in various constructions and combinations, all as hereinafter described and particularly pointed out in the claims.

Figure 1:
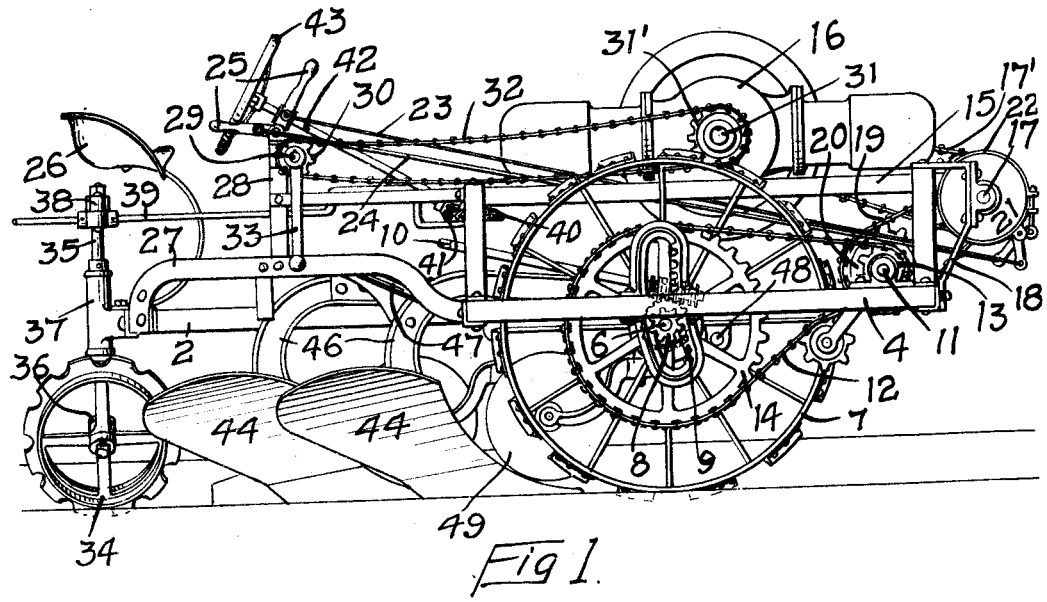
Figure 2:
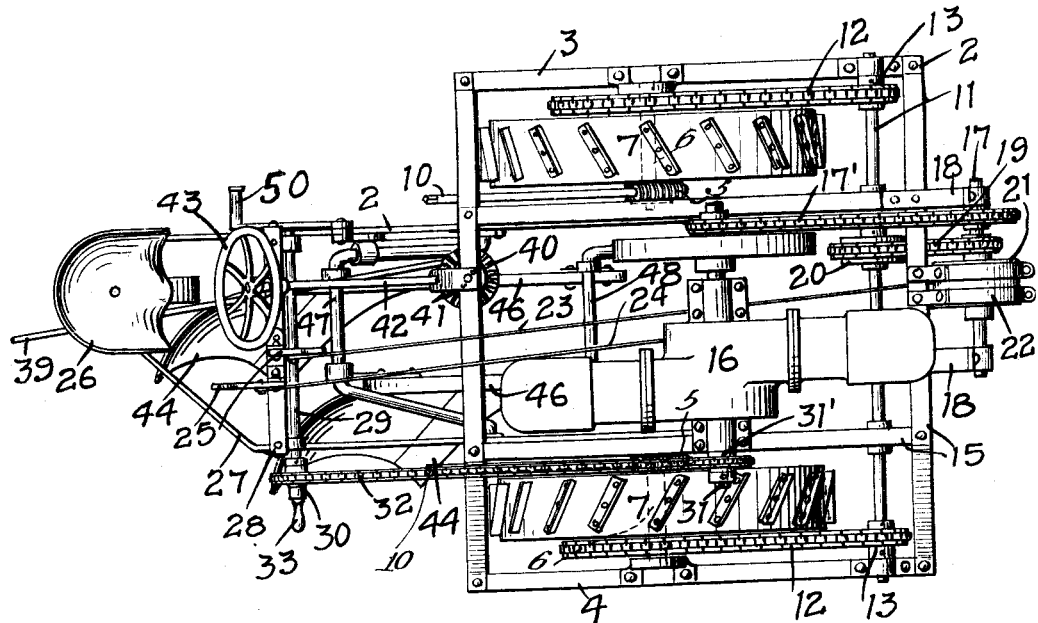

In the accompanying drawings, forming part of this specification, Figure 1 is a side elevation of a motor plow, embodying our invention, Fig. 2 is a plan view of the same, Fig. 3 is a front view, Fig. 4 is a detail view illustrating a draft attachment, by means of which the machine may be attached to other agricultural implements, Fig. 5, is a detail view of the guiding wheel and the mechanism attached thereto.

In the drawings the frame 2 is shown as having side bars 3 and 4. The traction wheels 7 have their hubs journaled on spindles 5 and 6, and a pinion 8 is secured on the end of each spindle, and mesh with the racks 9, that are secured to the bars 3 and 4 respectively. A post 10 is arranged at each side adjacent the bars 3 and 4 and is provided with a suitable gear which meshes with a gear secured to the spindles 5 and 6 respectively, so that the driver, by revolving the post, can raise or lower each side of the frame independently for the purpose of varying the elevation and allowing one wheel to run in the furrow, as shown in Fig. 2. This manner of raising and lowering the frame is common in binders and we have not thought it necessary to illustrate the same in detail herein. 11 is a drive shaft journaled in said frame and having driving connections with the traction wheels through belts 12, and sprockets 13. A superstructure 15 is mounted on said frame and has bearings thereon for a gas engine 16 of suitable type. A counter shaft 17 is journaled in brackets 18 parallel with the shaft 11 and a belt 19 connects a differential 20 on the shaft 11 with the counter shaft 17. The counter-shaft is driven through a belt 17' from the engine. The differential is of ordinary construction and need not be illustrated in detail. Upon the counter shaft we arrange planetary transmission gears 21, having straps 22 controlled by means of rods 23 and 24 and levers 25 arranged near the driver's seat 26. By means of these gears the driver can vary the speed of the machine and if desired, additional gears, permitting a further variation in speed may be utilized. We have not thought it necessary however, in this application, to show provision for any more than two speeds, but it will be understood that others may be provided whenever necessary.

27 represents an arched portion of the frame having upright standards 28 thereon, wherein a shaft 29 is journaled and provided with a sprocket 30, which is connected with the driving shaft 31 of the engine, whereon is mounted a ratchet sprocket 31', through a belt 32. By means of the crank 33 the driver can start the engine, the ratchet sprocket allowing slippage as soon as the engine is started, the chain, crank and sprockets remaining inoperative while the machine is at work. At the rear end of the machine is a single caster wheel 34 and a shaft 35 having a laterally turned lower end to form a bearing 36 for the wheel 34. The shaft 35 has a vertical bearing 37 on the rear portion of the frame and is provided at its upper end with an arm 38, in which a rod 39 is adjustably mounted. The forward end of said rod is connected with a beveled gear 40 that is mounted on the frame 15 and is operated by a pinion 41 on a steering post 42. The driver, seated at 26, can easily revolve this post by the hand wheel 43, rotate the gear 40 and oscillate the shaft 35 to guide the machine.

A series of plows 44 are arranged beneath the frame and are provided with beams 46, which are connected to bails 47 and 48. Colters 49 are provided in advance of the plows. A foot operated lever 50 is arranged on one side of the machine within reach of the driver and by means of which the plows may be raised and lowered, as desired. This raising and lowering mechanism or one of a similar construction is in general use in plows of this type and we make no claim to the novelty of the same herein as applied to ordinary wheel plows, and have not thought it necessary to illustrate the mechanism thereof in detail. It is sufficient to say that the driver will have complete control of the plows and can raise or lower them according to the character of the ground, over which the machine is moving, or the desired depth of the furrow, with his foot, while using his hands to control the engine.

It is frequently desirable to use a traction engine of this type without the plows and we therefore provide a draw bar 51, pivoted at 52 on the frame and preferably triangular in form and having a curved rear rail 53 with holes 54 therein, to which a clevis 55 may be attached and moved back and forth along the rail, as circumstances may require.

From an examination of Fig. 1, it will be noted that the engine is supported on the frame of the machine at a point where it will balance the weight of the rear portion of the frame and the parts carried thereby and hold the traction wheels firmly in contact with the soil, while the guiding wheel at the rear of the machine will be held down by the weight of the rider. This arrangement of the engine will allow the rear of the machine to be tilted easily and will greatly facilitate the guiding and handling of it by the driver.

In operation, the driver will crank the engine and having regulated the height of the frame, may lower or raise the plows by means of the foot lift mechanism, and accurately guide the machine across a field with the steering mechanism, regulating the speed as desired by means of the levers close at hand. At any time the plows may be raised out of the ground or lowered into the ground, all without leaving the driver's seat, and by foot power, leaving the operator's hands free to steer the machine and control the engine.

We claim as our invention:—

1. A motor driven plow comprising a rigid frame, traction wheels adjustably mounted in said frame to one side of its transverse center, a guiding wheel adjustably arranged at the rear end of said frame, means for turning said wheel to guide the plow, plows adjustably supported beneath said frame between said traction wheels and guide wheel, a motor mounted on said frame with the center of the weight thereof in advance of the axis of said traction wheels and operatively connected with said traction wheels, said motor acting as a counterbalance for the rear portion of said frame for removing the weight of said frame from said guide wheel, whereby said guide wheel can be easily operated.

2. A motor plow comprising a rigid frame, traction wheels mounted in said frame, a guiding wheel arranged at the rear end of said frame, plows adjustably supported beneath the frame between said traction wheels and said guide wheel, a motor mounted on said frame with the center of the weight thereof in advance of the axis of the traction wheels, a shaft located at the front of said frame, and having driving connection with said motor, a second shaft at the front end of said frame, having driving connection with the traction wheels, and driving connection with said first named shaft, said motor together with said shafts and driving connections, acting as a counterbalance for the rear portion of said frame for removing the weight of said frame from said guide wheel whereby said guide wheel, can be easily operated.

In witness whereof, we have hereunto set our hands this 21st day of July 1909.

WILLIAM L. WALTON.
JEROME WAGAR.

Witnesses:
J. EDGAR WAGAR,
H. M. WALTON.